(12) United States Patent
Hasegawa et al.

(10) Patent No.: US 8,436,126 B2
(45) Date of Patent: May 7, 2013

(54) RESIN COMPOSITION FOR ADHESIVE SHEET AND ADHESIVE SHEET USING THE COMPOSITION FOR FLEXIBLE PRINTED CIRCUIT BOARD

(75) Inventors: Shinichi Hasegawa, Joetsu (JP); Fumiki Higuchi, Joetsu (JP); Toru Ueki, Joetsu (JP)

(73) Assignee: Arisawa Mfg. Co., Ltd., Niigata (JP)

( * ) Notice: Subject to any disclaimer, the term of this patent is extended or adjusted under 35 U.S.C. 154(b) by 387 days.

(21) Appl. No.: 11/879,464

(22) Filed: Jul. 17, 2007

(65) Prior Publication Data

US 2008/0021163 A1    Jan. 24, 2008

(30) Foreign Application Priority Data

Jul. 19, 2006    (JP) ................... 2006-196773

(51) Int. Cl.
*C08G 59/08*    (2006.01)

(52) U.S. Cl.
USPC .......... 528/91; 528/93; 528/94; 523/400; 525/117; 525/107; 525/187

(58) Field of Classification Search ............ 525/107
See application file for complete search history.

(56) References Cited

U.S. PATENT DOCUMENTS

| | | | | |
|---|---|---|---|---|
| 4,524,181 A | * | 6/1985 | Adam et al. | 525/107 |
| 5,073,602 A | * | 12/1991 | Nakao et al. | 525/155 |
| 5,420,223 A | * | 5/1995 | Johnson | 528/91 |

FOREIGN PATENT DOCUMENTS

| | | |
|---|---|---|
| JP | 62-174283 A | 7/1987 |
| JP | 64-056779 A | 3/1989 |
| JP | 07-503469 A | 4/1995 |
| JP | 2003-231873 A | 8/2003 |
| JP | 2003231873 * | 8/2003 |
| WO | 93/15054 A1 | 8/1993 |

* cited by examiner

*Primary Examiner* — Shane Fang
(74) *Attorney, Agent, or Firm* — Drinker Biddle & Reath LLP

(57) ABSTRACT

The present invention provides a resin composition for an adhesive sheet, comprising an acrylic copolymer containing (A) an acrylate ester, methacrylate ester, or a mixture thereof, (B) acrylonitrile, methacrylonitrile, or a mixture thereof, and (C) an unsaturated carboxylic acid; an epoxy resin; and a curing agent, wherein the curing agent comprises at least one selection from Lewis acid-amine complexes.

10 Claims, 1 Drawing Sheet

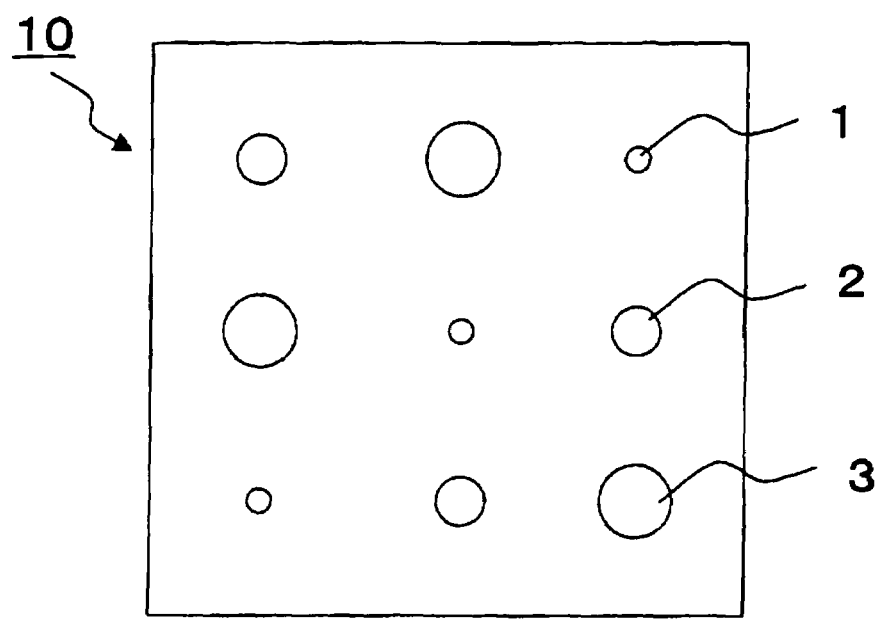

RESIN COMPOSITION FOR ADHESIVE SHEET AND ADHESIVE SHEET USING THE COMPOSITION FOR FLEXIBLE PRINTED CIRCUIT BOARD

CROSS REFERENCE TO RELATED APPLICATIONS

This application claims the priority of the Japanese Patent Application No. 2006-196773, filed Jul. 19, 2006 in the Japanese Patent Office, which is incorporated herein by reference in its entirety.

BACKGROUND

The present invention relates to a resin composition for an adhesive sheet and to an adhesive sheet using this composition for flexible printed circuit boards.

Flexible printed circuit board (FPC) has entered into widespread use as electronic and electrical machinery and devices have become thinner and lighter in recent years. During the mounting on FPC of electronic components such as resistors, ICs, and so forth, the FPC is glued through an adhesive sheet to a stiff reinforcing plate with the goal of improving the handling characteristics. The properties required of this adhesive sheet are, inter alia, a heat resistance capable of withstanding the solder reflow during mounting (solder heat resistance), adhesiveness for the FPC and reinforcing plate, and flexibility.

It is known that, for example, an acrylic-type adhesive composition comprising acrylic resin and epoxy resin can be used as an adhesive sheet that satisfies the aforementioned property requirements (refer, for example, to Japanese Patent Application Laid-open No. S 62-174283).

It is also known that an acrylic-type adhesive composition comprising acrylic resin, epoxy resin, and an epoxy curing agent can be used as the adhesive sheet (refer, for example, to Japanese Patent Application Laid-open No. 2003-231873).

SUMMARY

However, the acrylic-type adhesive composition of Japanese Patent Application Laid-open No. Sho 62-174283, while simultaneously satisfying the characteristics of adhesiveness, solder heat resistance, and flexibility, suffers from the problem of being unable to provide a satisfactory adhesiveness or solder heat resistance at low bonding temperatures (hot-press temperature).

The acrylic-type adhesive composition of Japanese Patent Application Laid-open No. 2003-231873 does provide a good adhesiveness and solder heat resistance through the use of, for example, an acid anhydride or aromatic amine as the epoxy curing agent, but suffers from the problem of not having a satisfactory storage stability at room temperature.

Accordingly, an object of the present invention is to provide a resin composition for adhesive sheet that has an excellent storage stability (shelf life) at room temperature and that post-cure exhibits solder heat resistance and flexibility and is able to maintain a high level of adhesiveness.

An additional object of the present invention is to provide an excellent adhesive sheet for application to flexible printed circuit boards, wherein the adhesive sheet uses the aforementioned resin composition for adhesive sheet.

The present invention achieves:
1. the aforementioned objects by providing a resin composition for an adhesive sheet, comprising an acrylic copolymer containing (A) an acrylate ester, methacrylate ester, or a mixture thereof, (B) acrylonitrile, methacrylonitrile, or a mixture thereof, and (C) an unsaturated carboxylic acid; an epoxy resin; and a curing agent, wherein the curing agent comprises at least one selection from Lewis acid-amine complexes.

The present invention also provides the inventions in the following 2 to 6.

2. The resin composition for an adhesive sheet according to 1 above, wherein the Lewis acid-amine complex is incorporated at 0.05 to 0.8 weight part per 100 weight parts of the acrylic copolymer and the unsaturated carboxylic acid is incorporated at 1 to 6 weight parts per 100 weight parts of the acrylic copolymer.

3. The resin composition for an adhesive sheet according to 1 or 2 above, wherein the component (A) is incorporated at 50 to 75 weight parts per 100 weight parts of the acrylic copolymer and the component (B) is incorporated at 20 to 45 weight parts per 100 weight parts of the acrylic copolymer.

4. The resin composition for an adhesive sheet according to any of 1 to 3 above, wherein the epoxy resin is incorporated in an amount in the range at which the ratio between the number of equivalents of its epoxy groups and the number of equivalents of carboxyl groups from component (C) is 1:1 to 2:1.

5. The resin composition for an adhesive sheet according to any of 1 to 4 above, wherein the acrylic copolymer is synthesized by solution polymerization.

6. An adhesive sheet for a flexible printed circuit board, comprising the resin composition for an adhesive sheet according to any of 1 to 5 above.

The present invention can provide a resin composition for an adhesive sheet that has an excellent storage stability (shelf life) at room temperature and that post-cure exhibits solder heat resistance and flexibility and is able to maintain a high adhesiveness.

The resin composition for adhesive sheet of the present invention is well adapted for application as an adhesive sheet for excellent flexible printed circuit boards.

DESCRIPTION OF DRAWINGS

FIG. 1 is a plan view that shows a hole pattern used in the evaluation of storage stability.

DETAILED DESCRIPTION

Embodiments of the present invention are described below. These embodiments are examples for the purpose of describing the invention, but there is no implication in this regard to limit the present invention to only these embodiments. The present invention can be executed in quite a variety of modalities while not deviating from its gist.

(The Resin Composition for Adhesive Sheet)

The resin composition for adhesive sheet according to the present invention comprises an acrylic copolymer containing (A) an acrylate ester, methacrylate ester, or a mixture thereof, (B) acrylonitrile, methacrylonitrile, or a mixture thereof, and (C) an unsaturated carboxylic acid; an epoxy resin; and a curing agent, wherein the curing agent comprises at least one selection from Lewis acid-amine complexes. This constitution provides an excellent storage stability at room temperature (shelf life) and post-cure provides solder heat resistance and flexibility and the ability to maintain a high adhesiveness.

In particular, the curing reaction at room temperature is inhibited by the use of the Lewis acid-amine complex as curing agent. This results in the manifestation of an excellent storage stability at room temperature.

In addition, during the curing reaction, the Lewis acid-amine complex, through its operation as a catalyst, promotes reaction between the carboxyl groups in the acrylic copolymer and the epoxy groups in the epoxy resin, and high adhesiveness is obtained by means of the hydroxyl groups produced by this reaction.

The Lewis acid-amine complex is preferably incorporated at 0.05 to 0.8 weight part per 100 weight parts of the acrylic copolymer, while component (C) is preferably incorporated at 1 to 6 weight parts per 100 weight parts of the acrylic copolymer. Making these additions in these highly suitable ranges provides excellent storage stability at room temperature and post-cure provides solder heat resistance and high adhesiveness.

Component (A) is preferably incorporated at 50 to 75 weight parts per 100 weight parts of the acrylic copolymer, while component (B) is preferably incorporated at 20 to 45 weight parts per 100 weight parts of the acrylic copolymer. This makes it possible to obtain a high adhesiveness and a satisfactory flexibility post-cure.

The epoxy resin is preferably incorporated in an amount in the range at which the ratio between the number of equivalents of its epoxy groups and the number of equivalents of carboxyl groups from component (C) is 1:1 to 2:1. This results in a thorough development of the reaction between the epoxy groups in the epoxy resin and the carboxyl groups in component (C), the almost complete absence of residual carboxyl groups, and the formation of a three-dimensional network crosslinked structure, and as a consequence a high adhesiveness and a satisfactory solder heat resistance can be obtained post-cure.

The acrylic copolymer is preferably synthesized by solution polymerization. The content of, for example, metal ions such as Na, can thereby be almost completely eliminated, which enables good electrical insulation properties (migration behavior) to be obtained.

The Lewis acid-amine complex used by the present invention can be exemplified by complexes between a Lewis acid such as $BF_3$, $BCl_3$, $TiCl_4$, $SnCl_4$, $SnCl_3$, $ZnBr_2$, $ZnCl_2$, $Zn(CH_3COO)_2$, $AlCl_3$, $AlBr_3$, $SiCl_4$, or $FeCl_3$, and an amine such as monoethylamine, n-hexylamine, benzylamine, triethylamine, aniline, or piperidine. Preferred thereamong are $BF_3$ complexes, such as the complex between $BF_3$ and monoethylamine.

The acrylic copolymer is a copolymer that contains (A) an acrylate ester, methacrylate ester, or a mixture thereof, (B) acrylonitrile, methacrylonitrile, or a mixture thereof, and (C) an unsaturated carboxylic acid.

The acrylate ester and methacrylate ester of (A) can be exemplified by methyl acrylate, ethyl acrylate, butyl acrylate, 2-ethylhexyl acrylate, methyl methacrylate, ethyl methacrylate, butyl methacrylate, 2-ethylhexyl methacrylate, and mixtures of the preceding.

The unsaturated carboxylic acid (C) can be exemplified by acrylic acid, methacrylic acid, itaconic acid, and mixtures of the preceding.

The method of polymerizing the acrylic copolymer is not particularly limited, and this polymerization can be carried out by emulsion polymerization, suspension polymerization, solution polymerization, and so forth. Solution polymerization, which enables the content of, for example, metal ions such as Na, to be almost completely eliminated, is preferred thereamong from the standpoint of providing good electrical insulation properties (migration behavior).

The epoxy resin can be exemplified by bisphenol-type epoxy resins such as bisphenol A-type epoxy resins, bisphenol F-type epoxy resins, and bisphenol S-type epoxy resins; novolac-type epoxy resins such as phenol novolac-type epoxy resins and cresol novolac-type epoxy resins; biphenyl-type epoxy resins; epoxy resins containing the naphthalene ring; and alicyclic epoxy resins. Phenol novolac-type epoxy resins are preferred thereamong from the standpoint of providing a good adhesiveness and good solder heat resistance.

The epoxy resin may comprise two or more epoxy resins used in combination.

With the objective of improving the film application properties of the resin composition for adhesive sheet of the present invention, this resin composition may incorporate, for example, a fluorine-type or silicon-type leveling agent. A silane coupling agent may also be incorporated with the objective of inducing an additional improvement in the solder heat resistance.

(Example of a Procedure for Synthesizing the Resin Composition for Adhesive Sheet)

65 weight parts butyl acrylate as component (A), 31 weight parts acrylonitrile as component (B), 4 weight parts acrylic acid as component (C), and 0.2 weight part azobisisobutyronitrile (AIBN) are added to a reactor already containing 100 weight parts ethyl acetate. Polymerization is subsequently carried out for 8 hours at 70° C. while stirring and bubbling in nitrogen gas. After then cooling to room temperature, a diluent solution, such as methyl ethyl ketone, is added until a prescribed viscosity is reached, thus yielding the acrylic copolymer.

12.5 weight parts epoxy resin is then added in order to add epoxy groups in approximate equivalence with the carboxyl groups in the acrylic acid present in the acrylic copolymer; 0.20 weight part boron trifluoride-monoethylamine ($BF_3MEA$) is also added as the curing agent; stirring then yields the resin composition for adhesive sheet.

(The Adhesive Sheet for Flexible Printed Circuit Board)

The adhesive sheet of the present invention for flexible printed circuit board is an adhesive sheet made by forming the aforementioned resin composition for adhesive sheet into a film.

This adhesive sheet can be fabricated, for example, by coating the aforementioned resin composition for adhesive sheet on a release film. More specifically, the resin composition for adhesive sheet may be coated on the release-treated side of, for example, a polyethylene terephthalate (PET) film, polypropylene (PP) film, or polyethylene (PE) film, at least one side of which has been subjected to a release treatment. The adhesive sheet is then obtained by curing drying under prescribed curing•drying conditions (temperature: 80 to 180° C., time: 2 to 10 minutes) until a semi-cured state (also referred to hereafter as the B-stage) is reached. The coating thickness will vary depending on the application and is established as appropriate between 10 and 100 μm. With regard to the application process, a comma coater, die coater, gravure coater, and so forth can be used as appropriate in view of the coating thickness.

A completely cured adhesive sheet (C-stage) can be obtained by treating the B-stage adhesive sheet under prescribed curing conditions (temperature: 160 to 180° C., pressure: 2 to 3 MPa, time: 30 to 60 minutes).

EXAMPLES

The present invention is described in greater detail by the examples that follow, but the present invention is not limited to these examples. In addition to the examples provided below, the individual skilled in the art will be able to enact various modifications, and these modifications are also encompassed by the claims provided herein.

Examples 1 to 9 and Comparative Examples 1 to 7

Resin compositions for adhesive sheet were first prepared using the components and rates of incorporation (the unit for the numerical values is weight parts) shown in Tables 1 and 2.

Components (A), (B), and (C) were added in the particular weight parts shown in Tables 1 and 2 to a reactor that already contained ethyl acetate; 0.2 weight part azobisisobutyronitrile (AIBN, Kanto Chemical Co., Ltd.) was also added; and polymerization was carried out by solution polymerization for 8 hours at 70° C. while stirring and bubbling in nitrogen gas. This was followed by cooling to room temperature and the addition of methyl ethyl ketone to give a prescribed viscosity (3000 to 5000 cps), thereby yielding the acrylic copolymer. The viscosity was measured with a B-type viscometer.

The epoxy resin and curing agent shown in Tables 1 and 2 were subsequently added to the acrylic copolymer in the weight parts shown in Tables 1 and 2; stirring then yielded the resin composition for adhesive sheet.

epoxy resin: bisphenol A-type epoxy resin (epoxy group equivalent weight=180 g/eq), AER260 (Asahi Kasei Corporation)

Lewis acid-amine complex: boron trifluoride-monoethylamine ($BF_3MEA$) (Stella Chemifa Corporation)

imidazole type: 2-methylimidazole (2-MZ)(Shikoku Chemicals Corporation) aromatic amine type: 3,3'-diaminodiphenylsulfone (DAS) (Nihon Gosei Kako Co., Ltd.)

In each instance, the resulting resin composition for adhesive sheet was coated on release-treated PET film so as to provide a resin composition thickness of 25 μm. Curing·drying was carried out under prescribed curing·drying conditions (temperature: 150° C., time: 5 minutes) until the semi-cured state (B-stage) was reached, thus yielding the adhesive sheet.

Each of the resulting adhesive sheets was subjected to evaluation testing as described below.

(Storage Stability)

The adhesive sheet and a single-side copper-clad polyimide laminate were stacked in the given sequence on 125 μm-

TABLE 1

| | | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| incorporated components | acrylic copolymer | component (A) | 65 | 65 | 65 | 65 | 65 | 65 | 65 | 65 | 65 |
| | | component (B) | 31 | 31 | 31 | 34 | 34 | 34 | 29 | 29 | 29 |
| | | component (C) | 4 | 4 | 4 | 1 | 1 | 1 | 6 | 6 | 6 |
| | epoxy resin | | 12.5 | 12.5 | 12.5 | 3.1 | 3.1 | 3.1 | 18.6 | 18.6 | 18.6 |
| | curing agent | Lewis acid-amine complex imidazole type aromatic amine type | 0.05 | 0.20 | 0.80 | 0.05 | 0.20 | 0.80 | 0.05 | 0.20 | 0.80 |
| results of evaluation | storage stability | | ++ | ++ | + | ++ | ++ | ++ | + | + | + |
| | solder heat resistance | | ++ | ++ | ++ | + | + | + | ++ | ++ | ++ |
| | peel strength | | ++ | ++ | ++ | ++ | ++ | ++ | + | + | + |

TABLE 2

| | | | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| incorporated components | acrylic copolymer | component (A) | 65 | 65 | 65 | 65 | 65 | 65 | 65 |
| | | component (B) | 15 | 31 | 31 | 31 | 31 | 31 | 31 |
| | | component (C) | 10 | 4 | 4 | 4 | 4 | 4 | 4 |
| | epoxy resin | | 12.5 | 12.5 | 12.5 | 12.5 | 12.5 | 37.5 | 6.25 |
| | curing agent | Lewis acid-amine complex | 0.80 | 1.00 | | | | 0.20 | 0.20 |
| | | imidazole type | | | | 0.20 | | | |
| | | aromatic amine type | | | | | 0.20 | | |
| results of evaluation | storage stability | | X | X | ++ | X | X | ++ | ++ |
| | solder heat resistance | | ++ | ++ | X | ++ | ++ | ++ | X |
| | peel strength | | + | + | + | X | X | X | + |

The details for each component in Tables 1 and 2 are provided below.

component (A): butyl acrylate (monomer) (Toagosei Co., Ltd.)

component (B): acrylonitrile (monomer) (Kanto Chemical Co., Inc.)

component (C): acrylic acid (monomer) (Toagosei Co., Ltd.)

thick polyimide film, and this was hot-press bonded under heating/pressing conditions of 160° C./2.45 Mpa/30 minutes to produce a sample for evaluation of the storage stability. Thus, the aforementioned laminate was temporarily bonded such that the adhesive sheet was in contact with the polyimide side of the laminate; this was cut to 10 cm square; holes were opened in accordance with the hole pattern 10 shown in FIG. 1; and the assembly was stacked on the polyimide film. The hole pattern 10 was a pattern in which holes 1 with a diameter of 1 mm, holes 2 with a diameter of 3 mm, and holes 3 with a diameter of 5 mm were randomly arranged. The single-side copper-clad polyimide laminate used in these examples was constructed from a 25 μm-thick polyimide layer, an adhesive layer comprising a known adhesive for use with FPC, and 35 μm-thick cold-rolled copper foil.

In the procedure for evaluating storage stability, storage was carried out for the prescribed period of time in the dark at ambient conditions (room temperature) of 25° C. and 50% RH. After this treatment, evaluation was carried out based on the amount of exuded adhesive sheet resin that had exuded out from the openings. To obtain this exuded amount, the distance from the border of the hole to the tip of the resin was measured using a microscope where the resin had outmigrated the most; less than 0.1 mm was rated as NG.

++: after storage for 50 days, exudation of the adhesive sheet resin in the above-described evaluation of storage stability was at least 0.1 mm.

+: after storage for 25 days, exudation of the adhesive sheet resin in the above-described evaluation of storage stability was at least 0.1 mm.

x: after storage for 25 days, exudation of the adhesive sheet resin in the above-described evaluation of storage stability was less than 0.1 mm.

(Solder Heat Resistance)

The adhesive sheet and 25 μm-thick polyimide film were stacked in the given sequence on 125 μm-thick polyimide film; hot-press bonding under heating/pressing conditions of 160° C./2.45 Mpa/30 minutes then gave the solder heat resistance sample. Here, the adhesive sheet was temporarily bonded on the 25 μm-thick polyimide film and this was then stacked on the 125 μm-thick polyimide film.

In the procedure for evaluating solder heat resistance, the 125-μm polyimide film side was held floating for 1 minute on a solder bath at the prescribed temperature. This was followed by visual inspection to determine the presence/absence of debonding, blistering, and so forth. The evaluation was scored on the following scale.

++: no debonding or blistering after floating for 1 minute on a 300° C. solder bath.

+: no debonding or blistering after floating for 1 minute on a 260° C. solder bath.

x: debonding and blistering were present after floating for 1 minute on a 260° C. solder bath.

(Peel Strength)

The peel strength sample was fabricated by stacking the adhesive sheet and a single-side copper-clad polyimide laminate in the given sequence on a 125 μm-thick polyimide film and hot-press bonding under heating and pressing conditions of 160° C./2.45 MPa/30 minutes.

The procedure for evaluating the peel strength (adhesive strength) was based on JPCA BM-02, and the peel strength (adhesive strength) was evaluated by peeling the single-side copper-clad polyimide laminate at 900.

++: the peel strength is at least 15 N/cm, which indicates an adhesive strength that is entirely unproblematic from a practical standpoint.

+: the peel strength is at least 10 N/cm but less than 15 N/cm, which indicates a practical adhesive strength.

x: the peel strength is less than 10 N/cm, which indicates an unsatisfactory adhesive strength.

Migration testing as described below was also carried out on the resin composition for adhesive sheet of Example 1.

(Migration)

The sample for migration testing was prepared as follows: a prescribed treatment was carried out on the copper foil layer of the single-side copper-clad polyimide laminate described above to form a comb-shaped pattern with line/space=80 μm/80 μm; the adhesive sheet from Example 1 and 25-μm polyimide film were stacked in the given sequence on this pattern; and hot-press bonding was carried out under heating and pressing conditions of 160° C./2.45 MPa/30 minutes.

The sample thus obtained was submitted to testing under prescribed conditions (voltage: DC 100V, temperature: 85° C., 85% RH), and the change in voltage over a prescribed time (1000 hr) was measured.

With regard to the results of this evaluation, the migration behavior was adjudged as excellent when the resistance value after the prescribed time had elapsed was at least $1.0 \times 10^8 \Omega$.

As shown by the evaluation results in Tables 1 and 2, the resin compositions for adhesive sheet that are obtained by reaction of the incorporated components of Examples 1 to 9 exhibit an excellent storage stability at room temperature (shelf life) and post-cure exhibit solder heat resistance after cure and a high peel strength.

In contrast to this, Comparative Examples 1 and 2, in which, of the Lewis acid-amine complex and acrylic acid, one was present in a suitable amount while the other was present in excess, are unable to provide a satisfactory storage stability due to the development of the curing reaction when the B-stage adhesive sheet is stored at room temperature. Comparative Example 3, which did not contain a curing agent, does have an excellent storage stability, but provides an unsatisfactory solder heat resistance after being cured under curing conditions of 160° C./2.45 MPa/30 minutes. Due to their use of an imidazole-type curing agent or an aromatic amine-type curing agent, Comparative Examples 4 and 5 do have an excellent post-cure solder heat resistance; however, when the pre-cure (B-stage) adhesive sheet is stored at room temperature, the curing reaction progresses and the storage stability and peel strength become unsatisfactory. Comparative Example 6 provides an excellent pre-cure storage stability and an excellent post-cure solder heat resistance, but, due to the excess epoxy resin content, the post-cure peel strength is unsatisfactory. Comparative Example 7 is deficient in epoxy resin and an adequate three-dimensional network crosslinked structure between epoxy resin and acrylic acid is therefore not formed; the post-cure solder heat resistance is unsatisfactory as a consequence.

As described above, the resin composition of the present invention for adhesive sheet provides an adhesive sheet that pre-cure exhibits an excellent storage stability at room temperature (shelf life) and that post-cure exhibits solder heat resistance, flexibility, and a high adhesiveness. Moreover, an excellent electrical insulation behavior (particularly the migration behavior) was exhibited due to the polymerization of the acrylic copolymer by a solution polymerization procedure.

We claim:

1. A resin composition for an adhesive sheet, comprising:
   an acrylic copolymer containing:
   (A) an acrylate ester, methacrylate ester, or a mixture thereof,
   (B) acrylonitrile, methacrylonitrile, or a mixture thereof, and
   (C) an unsaturated carboxylic acid having carboxyl groups;
   an epoxy resin having epoxy groups;
   a curing agent, and
   a solvent wherein:

the curing agent comprises at least one selection from Lewis acid-amine complexes, wherein the Lewis acid-amine complex is incorporated at about 0.05 to 0.2 parts by weight based on 100 parts by weight of the acrylic copolymer, and component (C) is incorporated at about 1 to 6 parts by weight based on 100 parts by weight of the acrylic copolymer, and the epoxy resin is incorporated in a range at which the ratio between the number of equivalents of the epoxy groups and the number of equivalents of the carboxyl groups of component (C) is 1:1 to 2:1.

2. The resin composition for an adhesive sheet according to claim 1, wherein component (A) is incorporated at 50 to 75 weight parts based on 100 weight parts of the acrylic copolymer and component (B) is incorporated at 20 to 45 weight parts based on 100 weight parts of the acrylic copolymer.

3. The resin composition for an adhesive sheet according to claim 1, wherein the acrylic copolymer is synthesized by solution polymerization.

4. An adhesive sheet for a flexible printed circuit board, comprising the resin composition for an adhesive sheet according to claim 1.

5. The resin composition for an adhesive sheet according to claim 2, wherein the acrylic copolymer is synthesized by solution polymerization.

6. An adhesive sheet for a flexible printed circuit board, comprising the resin composition for an adhesive sheet according to claim 2.

7. An adhesive sheet for a flexible printed circuit board, comprising the resin composition for an adhesive sheet according to claim 3.

8. An adhesive sheet for a flexible printed circuit board, wherein the adhesive sheet was formed from the resin composition for an adhesive sheet according to claim 1.

9. An adhesive sheet for a flexible printed circuit board, wherein the adhesive sheet was formed from the resin composition for an adhesive sheet according to claim 2.

10. An adhesive sheet for a flexible printed circuit board, wherein the adhesive sheet was formed from the resin composition for an adhesive sheet according to claim 3.

* * * * *